United States Patent [19]
Takahata

[11] Patent Number: 5,464,655
[45] Date of Patent: Nov. 7, 1995

[54] METHOD AND APPARATUS FOR PREPARING METAL-CERAMIC COMPOSITE BODY

[75] Inventor: Shigeru Takahata, Chiba, Japan

[73] Assignee: Shin-Etsu Chemical Co., Ltd., Tokyo, Japan

[21] Appl. No.: 273,831

[22] Filed: Jul. 12, 1994

[30] Foreign Application Priority Data

Jul. 29, 1993  [JP]  Japan .................................. 5-207083
Oct. 29, 1993  [JP]  Japan .................................. 5-294193

[51] Int. Cl.$^6$ .................................................. B05D 7/22
[52] U.S. Cl. ......................... 427/238; 427/294; 427/431; 427/432; 427/445
[58] Field of Search .................................. 427/431, 432, 427/445, 238, 294

[56] References Cited

U.S. PATENT DOCUMENTS 2,671,455  3/1954  Grubel et al. ............................ 427/431
3,536,524  10/1970  Sisson ...................................... 427/445
3,824,113  7/1974  Loxley et al. ........................... 427/431
4,777,014  10/1988  Newkirk et al. ......................... 419/12
5,298,283  3/1994  Rocazello et al. ...................... 427/432

Primary Examiner—Benjamin Utech
Attorney, Agent, or Firm—McAulay Fisher Nissen Goldberg & Kiel

[57] ABSTRACT

A metal-ceramic composite body is prepared by impregnating a porous ceramic preform with a molten metal. A preform (3, 15), a crucible (7) containing molten metal (6), and a channeling bundle (8) of filaments are set such that one end of the bundle (8) is disposed above the molten metal (6) in the crucible (7) and the other end of the bundle (8) is disposed in contact with the preform (3, 15). The crucible (7) is moved up until the bundle one end is immersed in the molten metal (6) whereby the molten metal (6) is channeled to the preform (3, 15) through the filaments of the bundle (8) for impregnating the preform (3, 15) with the molten metal. The crucible (7) is moved down until the bundle one end is withdrawn from the molten metal (6) whereby supply of the molten metal to the preform (3, 15) is interrupted.

15 Claims, 5 Drawing Sheets

METHOD AND APPARATUS FOR PREPARING METAL-CERAMIC COMPOSITE BODY

BACKGROUND OF THE INVENTION

1. Field of the Invention

This invention relates to a method and apparatus for preparing a metal-ceramic composite body by impregnating a porous ceramic preform with a molten metal. More particularly, it relates to such a method and apparatus which facilitates impregnation of porous ceramic preforms of various shapes with molten metal while controlling the feed and feed rate of molten metal, thereby producing a metal-ceramic composite body without flaw.

2. Prior Art

Composite products of ceramic and metal are generally prepared by manufacturing porous ceramic preforms and impregnating the preforms with molten metal.

One of the simplest methods for supplying molten metal to preforms for impregnation is by containing molten metal in a crucible, placing a preform above the crucible, and bringing the preform in contact with the molten metal whereby the preform is entirely impregnated with the molten metal by utilizing the capillary phenomenon associated with micropores or interconnected cells in the preform. This method suffers from several problems.

(a) When a multiplicity of relatively small size preforms are impregnated at once, it is difficult to arrange a multiplicity of preforms such that all the preforms may be uniformly impregnated with molten metal.

(b) Since preforms are impregnated with molten metal by utilizing the capillary phenomenon of the preforms, it is impossible to obtain composite products using preforms having a height exceeding a certain limit.

(c) If exothermic reaction accompanies when preforms are impregnated with molten metal, many preforms can be damaged.

(d) Often more metal is adhered to the outside, especially the bottom of a product, rendering post-treatment difficult.

Another method is described in the Journal "ADVANCED MATERIAL AND PROCESSES", 7/91, p. 25. A metal to be infiltrated (single metal or alloy) is placed in a suitable container, the metal is disposed adjacent to the top or bottom of a preform, and the container is heated to melt the metal whereby the preform is impregnated with the molten metal. This method also suffers from several problems.

(e) The method is not suited for large scale manufacture since a container is necessary for each of products.

(f) Where a plurality of preforms are disposed in a container and impregnated with molten metal, the preforms are at least partially submerged in the molten metal. The molten metal adheres to the outside of the resulting composite body. A difficult post-treatment is necessary to remove the metal deposit from the composite body after cooling and solidification.

(g) Where it is desired to impregnate a cylindrical preform of a substantial length with molten metal, it is almost impossible to place the metal at the top of the preform because the metal is melted. The metal is naturally placed below the preform, which gives rise to problems similar to the above-mentioned problems (a), (b), and (c).

SUMMARY OF THE INVENTION

Therefore, an object of the present invention is to provide a method and apparatus for preparing a metal-impregnated ceramic composite body which facilitates impregnation of porous ceramic preforms with molten metal while controlling the feed and feed rate of molten metal.

According to the present invention, there is provided a method for preparing a metal-ceramic composite body by impregnating a porous ceramic preform with a molten metal. A porous ceramic preform, a crucible containing a molten metal, and a channeling bundle of a plurality of filaments having one end and an opposite end are set such that the one end of the bundle is disposed above the molten metal in the crucible and the opposite end of the bundle is disposed in contact with the preform. The crucible is moved upward until the one end of the bundle is submerged in the molten metal whereby the molten metal is channeled to the preform through the filaments of the bundle for impregnating the preform with the molten metal. The crucible is moved downward until the one end of the bundle is removed from the molten metal whereby channeling of the molten metal to the preform is interrupted.

The present invention also provides an apparatus for preparing a metal-ceramic composite body by impregnating a porous ceramic preform with a molten metal, comprising a vessel in which a porous ceramic preform is disposed, a support disposed for vertical motion, a crucible resting on the support and containing a molten metal therein, and a channeling bundle of a plurality of filaments having one end and an opposite end. The bundle is set such that the one end of the bundle may be submerged in the molten metal in the crucible and the opposite end of the bundle may be in contact with the preform.

The porous ceramic preform used herein is a shaped body of porous ceramic material. It may be a green body, a calcined body or a sintered body. The porous ceramic material has interconnected cells allowing infiltration of molten metal.

ADVANTAGES

Since the filament bundle is used for channeling molten metal from the crucible to the preform, a composite body of any desired shape and size can be prepared without the preform being limited in shape and size. A preform arrangement ready for impregnation of molten metal is simple. Without a need for a special tool, molten metal can be channeled from the crucible to the porous ceramic preform simply by immersing the bundle at one end in the molten metal and contacting the bundle at the other end with the preform. The start and end of molten metal supply are triggered simply by moving up and down the crucible for moving the one end of the bundle to and away from the molten metal in the crucible. The supply and termination of molten metal is readily controlled. The feed rate of molten metal can be controlled, for example, by positioning discrete filaments of the bundle at the one end at different levels for changing the number of filaments submerged in the molten metal. Then even when exothermic reaction takes place between the molten metal and the preform, such reaction can be controlled by adjusting the feed rate of molten metal. The thus impregnated composite body receives no damage or flaw. In impregnating the preform with molten metal, the amount of excess metal depositing on the outside of the preform is minimized to facilitate post-treatment. High strength ceramic-metal composite bodies can be manufactured in a simple efficient manner.

The present invention is versatile and applicable to almost all composite bodies between ceramics and metals. Those composite bodies obtained by impregnating lightweight, high hardness ceramics such as silicon carbide, silicon nitride, and alumina with aluminum are useful as slide members in aircraft and automobiles. The invention is also useful in the manufacture of reaction sintered silicon carbide by impregnating a preform of silicon carbide and carbonaceous material with molten metallic silicon.

BRIEF DESCRIPTION OF THE DRAWINGS

The above and other objects and features of the present invention will be more fully understood by reading the following description taken in conjunction with the accompanying drawings.

DESCRIPTION OF THE PREFERRED EMBODIMENT

Figure 1:
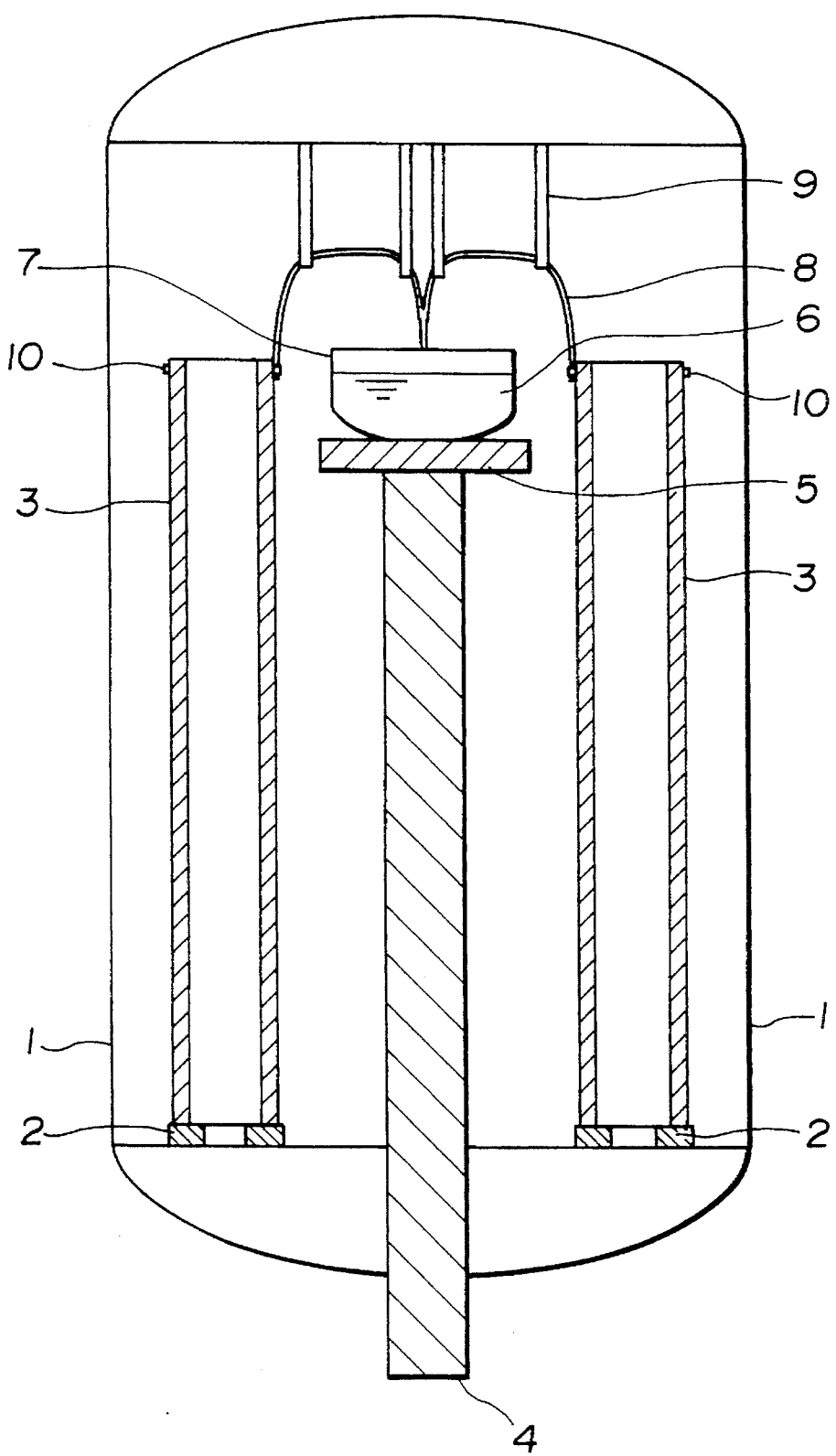
FIG. 1 is a schematic cross section of an apparatus according to one embodiment of the invention.

Referring to FIG. 1, there is illustrated a ceramic preform impregnating apparatus according to one embodiment of the invention. The apparatus is designed to impregnate a cylindrical porous ceramic preform having a length of at least 2 m with molten metal. The apparatus includes an upright closed cylindrical vessel 1 having a horizontal bottom plate inside. Inside the vessel 1, a plurality of hollow cylindrical preforms 3 stand upright on the bottom plate via spacers 2. The number of preforms 3 is two in the illustrated embodiment, but may be three or more and if desired, a single preform is acceptable. A shaft 4 extends vertically and concentrically in the vessel 1 and has a support 5 secured at the top. The shaft 4 is passed through the bottom wall of the vessel 1 in a gas tight manner and is extended downward and coupled to a drive (not shown) for axially moving the shaft 4. By actuating the drive, the shaft 4 and hence, the support 5 is vertically moved up and down. A crucible 7 containing a molten metal 6 therein rests on the support 5.

Channels 8 each in the form of a bundle of a plurality of filaments are suspended from the ceiling wall of the vessel 1 by suspending members 9. The channeling bundle 8 has one end disposed above the molten metal 6 in the crucible 7. When the support 5 and hence, the crucible 7 is lifted upward, the bundle one end is submerged in the molten metal 6. When the support 5 and hence, the crucible 7 is moved downward, the bundle one end is separated from the molten metal 6, that is, submergence of the bundle one end in the molten metal is cancelled. The channeling bundle 8 has another end which is contacted and secured to the top of the preform 3 by winding and tightening a thread fastener 10. Though not shown, suitable heaters are disposed in the vessel 1 for heating the preforms 3 and the crucible 7. The interior of the vessel 1 can be evacuated to vacuum by a vacuum pump (not shown).

The preforms are generally prepared from a ceramic powder consisting of at least one member selected from the group consisting of alumina, zirconia, tungsten carbide, silicon carbide, silicon nitride, and carbon and having a particle size of less than about 1 mm, preferably about 1 to about 500 µm. The ceramic powder is optionally blended with a binder and molded by any suitable molding method such as mold press and slip casting methods. A green body may be the preform. If desired, it may be calcined or sintered. Since the preform is to be impregnated with molten metal, it should have continuous pores or interconnected cells.

The channeling bundle of filaments is an assembly of filaments having a diameter of up to 100 µm, preferably up to 50 µm, more preferably up to 15 µm. The filaments should be inert upon contact with molten metal or maintain their shape unchanged even when they are reactive with molten metal, and be wettable with molten metal. Exemplary fibers are carbon fibers, silicon carbide fibers, alumina fibers, and glass fibers, but not limited thereto. A choice may be made by taking into account economy and the above-mentioned requirements. The filament bundle may have any desired shape insofar as the benefits of the invention are not impaired. The bundle may take the form of string, strip or fabric, with the string form being preferred. A string bundle having a diameter of about 0.1 to about 1 mm is more preferred. One or more bundles may be used for each of the preforms.

The metal to be infiltrated into the preform is not particularly limited and may be suitably selected in accordance with the intended application of a composite body. Exemplary metals are aluminum, silicon, magnesium, nickel, cobalt titanium, tin, zinc, and copper and alloys containing such metals.

Using the apparatus of the above-mentioned construction, the preforms 3 are impregnated with molten metal 6 by lifting upward the support 5 and the crucible 7 until the one end of the filament bundle 8 is submerged in the molten metal 6 in the crucible 7. Then the molten metal 6 is channeled along the gaps between the filaments of the bundle 8 to the top of the preform 3. The molten metal reaching the preform top then infiltrates through the preform to its bottom end while passing through the micropores in the preform. In this way, the preforms 3 are impregnated with the molten metal. At the end of impregnation, the support 5 and the crucible 7 are moved downward to withdraw the one end of the channeling bundle 8 from the molten metal 6 in the crucible 7. At this point, supply of molten metal to the preforms 3 is interrupted.

In the apparatus shown in FIG. 1, the relative position of the preform 3 and the melt 6 is not particularly limited insofar as the melt 6 can be channeled to the preform 3 through the bundle 8. However, if the contact between the preform 3 and the bundle 8 is located above the crucible 7 by a vertical distance of more than 1 m, for example, 2 m, then the supply of the melt is slowed down and even worse, stopped. Thus the contact between the preform 3 and the bundle 8 is preferably located under the crucible 7 by a vertical distance more than 1 m.

The contact between the preform 3 and the channeling bundle 8 is satisfactory if the bundle 8 is contacted with the preform 3 at a limited narrow top area, for example, the top edge in the illustrated embodiment. The molten metal once channeled to the top of the preform 3 passes downward through the preform 3 at a uniform speed under the impetus of gravity, accomplishing impregnation and in some cases, concurrent reaction.

The channeling bundle 8 is contacted with the preform 3 by clamping with the thread fastener 10 in FIG. 1. The thread fastener 10 used herein is preferably of the same material as the bundle filaments. In another example, a part of the bundle 8 is integrally molded with the preform 3. Also, the other end of the bundle 8 may be wound around the top of the preform 3. In an alternative example, the bundle 8 is not previously contacted with the preform, and instead, the bundle 8 is spaced apart from the preform 3 and impregnation of the preform with the melt is started by bringing the other end of the bundle into contact with the preform.

Figure 2:
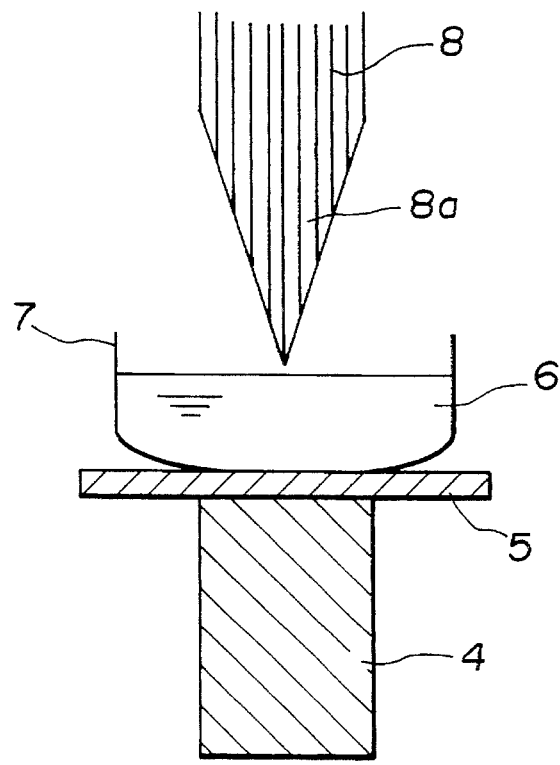
FIG. 2 is an enlarged view of one exemplary arrangement of the crucible and the channeling bundle.
Figure 3:
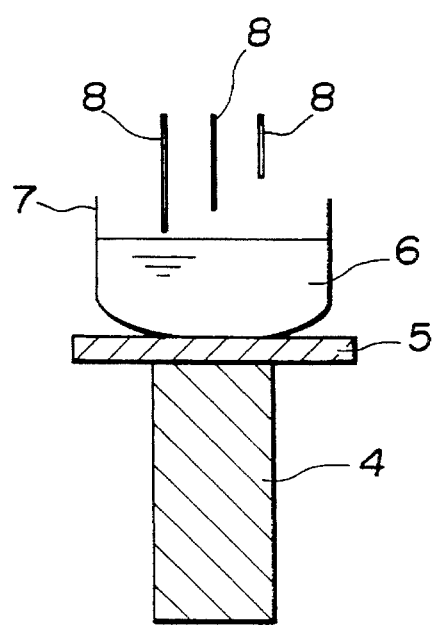
FIG. 3 is a view similar to FIG. 2 of another arrangement.

If exothermic reaction takes place during impregnation, it is preferred to avoid abrupt reaction at the initial stage of impregnation. To this end, one end 8a of the channeling bundle 8 to contact the molten metal 6 is advantageously tapered into a conical shape as shown in FIG. 2, thereby controlling the feed rate of the melt to the preform. An alternative approach is shown in FIG. 3 wherein a plurality of filament bundles 8 are disposed such that their one ends are positioned at different levels. Then when the crucible 7 is moved upward, the bundle having its end at the lowest level is first submerged in the melt and so on. The feed rate of the melt to the preform is controlled in this way.

Impregnation with molten metal is generally carried out in an inert atmosphere or in vacuum. To avoid formation of voids in the composite body, a vacuum of lower than 10 Torr is preferred.

Figure 4:
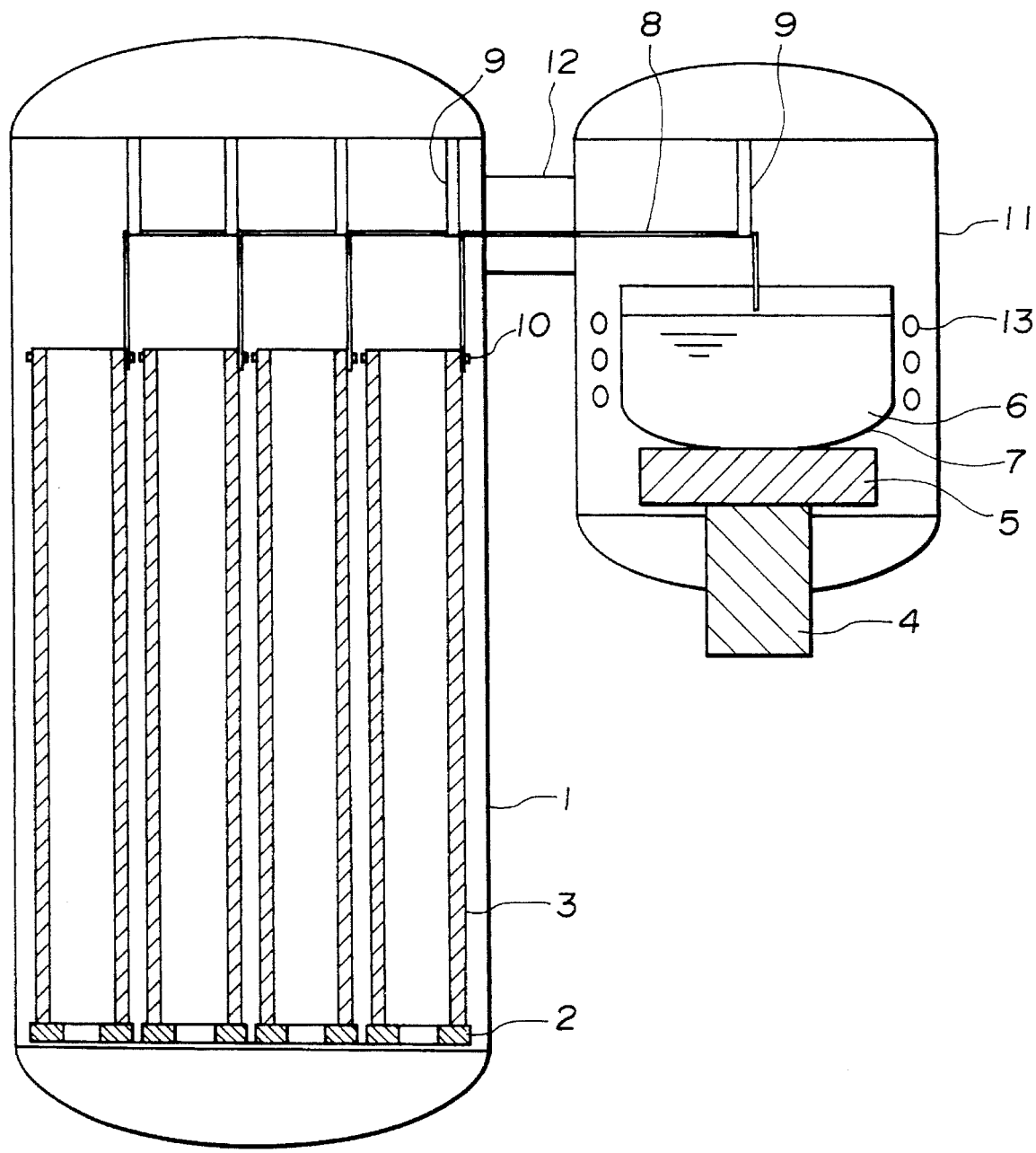
FIG. 4 is a schematic cross section of an apparatus according to another embodiment of the invention.

FIG. 4 illustrates an impregnating apparatus according to another embodiment of the invention. In this embodiment, a vessel 1 in which preforms 3 are received, that is, a preform-treating vessel and a vessel 11 in which a crucible 7 is disposed, that is, a melt-containing vessel are separately furnished. These vessels 1 and 11 are inter-connected at the top through a connecting duct 12. A channeling bundle or bundles 8 are extended from the vessel 1 to the vessel 11 through the duct 12. Since the remaining components and operation are the same as in the first embodiment of FIG. 1, like parts are designated by the same numerals and their description is omitted for convenience sake.

The vessels 1 and 11 are maintained vacuum by means of a vacuum pump (not shown). The preforms 3 are heated by resistance heaters (not shown) while the crucible 7 is heated by an induction heating coil 13.

Since the preform-treating vessel 1 and the melt-containing vessel 11 are separate, more preforms can be arranged in the preform-treating vessel 1. This is advantageous when it is desired to manufacture a number of elongated silicon carbide-metallic silicon composite bodies which are as long as 1,000 to 2,500 mm, for example, liner tubes and processing tubes for use in semiconductor manufacture. Since separate heating systems can be used in the respective vessels, a choice of heat source becomes free.

Figure 5:
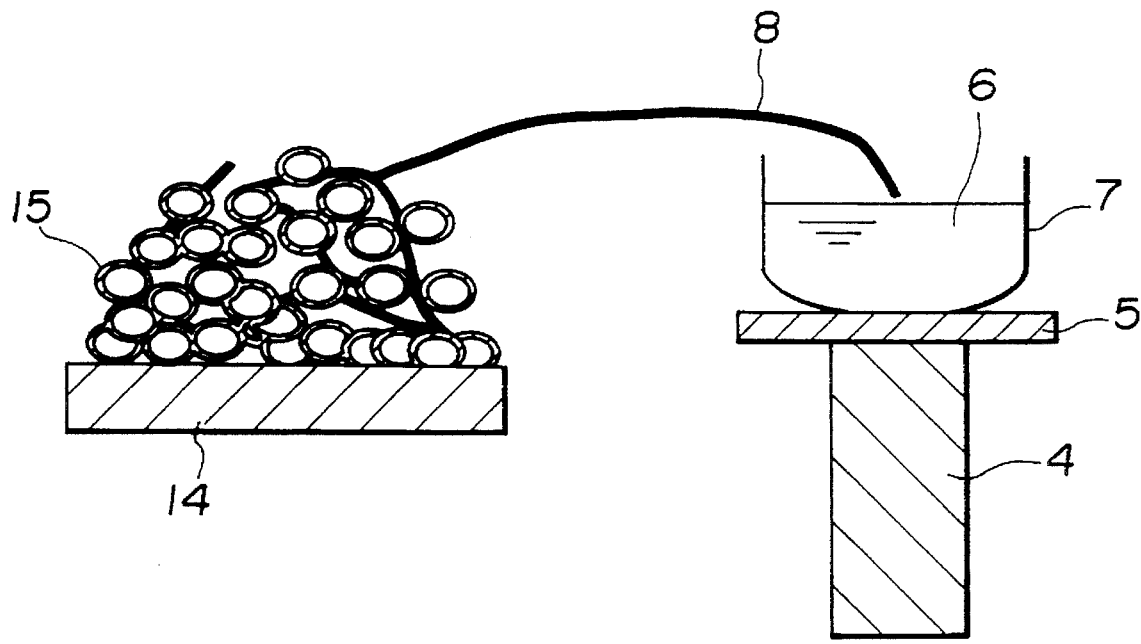
FIG. 5 is a view similar to FIG. 2 of a further arrangement.

FIG. 5 illustrates a further embodiment which is intended for concurrent impregnation of a plurability of doughnut-shaped preforms 15 resting on a platform 14. A plurality of doughnut-shaped preforms 15 are stacked like a pile on the platform 14. The other end of the channeling bundle 8 is located within the pile of preforms 15. Without a particular need to fasten the bundle 8 to the preform(s) 15, the preforms 15 are readily impregnated with the melt 6. If desired, the other end of the bundle is disintegrated so that the discrete filaments may be respectively fastened to the preforms. Of course, use of a plurality of filament bundles 8 is acceptable.

Figure 6:
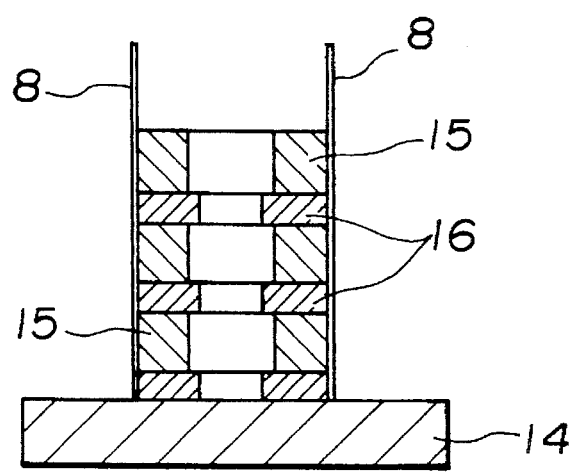
FIG. 6 is a view similar to FIG. 2 of a still further arrangement.

Another example is shown in FIG. 6. A plurality of doughnut-shaped preforms 15 and spacers 16 are alternately stacked in alignment. The other end of the channeling bundle 8 is contacted with the stack of preforms 15 at the outside whereby the melt is supplied to the preforms 15 through the bundle 8 for impregnation. There are obtained composite bodies with minimized deposition of extra metal, with better results. The spacers 16 used in FIG. 6 are effective for ensuring easy separation of impregnated products, thus facilitating post-treatment thereof.

The remaining components and operation of the embodiments of FIGS. 5 and 6 are the same as in the first embodiment of FIG. 1. These embodiments may also use two vessels like the embodiment of FIG. 4.

The thus impregnated preforms or composite bodies are generally subject to post-treatment. The type of post-treatment depends on how the preforms are impregnated. In the embodiment of FIG. 1, for example, the preforms 3 and filament bundles 8 are solidified with the metal used. With the bundles cut, the metal-impregnated preforms or composite bodies are taken out of the vessel and surface treated by sand blasting or the like, obtaining composite bodies with a finished surface. In the embodiment of FIG. 6, the spacers 16 should preferably be made of dense carbonaceous material. Then the composite bodies are readily separated discrete by breaking the spacers 16 by sand blasting or the like.

In the practice of the invention, an additional channeling bundle of filaments may be used with one end positioned in contact with the bottom of the preform and another end positioned above a reservoir. Then an extra of molten metal with which the preform is impregnated can be channeled and recovered to the reservoir through the additional bundle. This avoids excessive deposition of the molten metal to the preform and the apparatus components.

Figure 7:
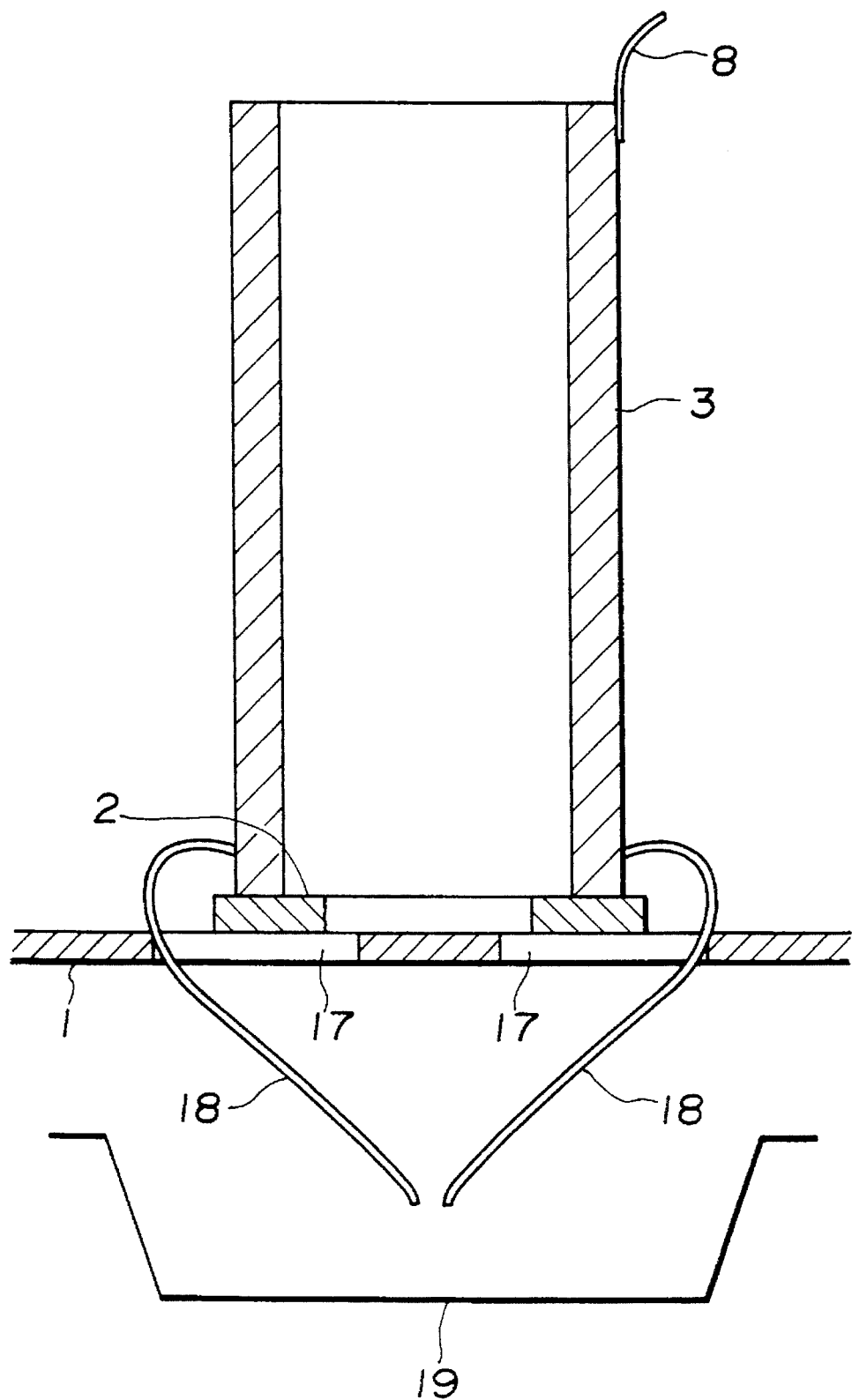
FIG. 7 is a schematic cross section of an apparatus according to a further embodiment of the invention.

This arrangement is illustrated in FIG. 7. A channeling bundle 18 of filaments has one end disposed in contact with the lower end of the preform 3. The bundle 18 is extended downward through an opening 17 in the bottom plate of the vessel 1. The other end of the bundle 18 is suspended above a reservoir 19 which is disposed below the bottom plate. Then an extra of molten metal is channeled and recovered to the reservoir 19 through the bundle 18. Such a recovery system is not limited to the illustrated arrangement.

Experiment

Preforms were prepared by mixing three fractions of silicon carbide particles having a mean particle size of 50 μm, 10 μm and 1 μm in a weight ratio of 50:30:20, molding the mixture into a ring shape with the aid of a polyvinyl-alcohol binder, and firing the rings at 1,000° C. in an air atmosphere. A channeling bundle was a string-like bundle of about 500 Nicalon filaments having a diameter of 14 μm (manufactured by Nippon Carbon K. K.). Spacers were of graphite. Ten preforms and spacers were alternately stacked as shown in FIG. 6. The preforms were impregnated with molten aluminum in vacuum at 720° C. and allowed to solidify. There were obtained void-free dense SiC—Al composite bodies.

Only a small amount of aluminum deposited on the outside of the composite body. The channeling bundle and the graphite spacer both aluminum entrained thereon could be readily removed by sand blasting with 100-mesh under corundum.

In another run, preforms prepared from a mixture of silicon carbide powder and carbon powder were impregnated with metallic silicon at 1500° C. as above. Impregnation proceeded while reaction took place between carbon and silicon. Satisfactory SiC—Si composite bodies were obtained.

The present invention enables to impregnate porous ceramic preforms of various shapes with molten metal and control the feed and feed rate of molten metal, succeeding in producing ceramic-metal composite bodies without flaw.

Although some preferred embodiments have been described, many modifications and variations may be made thereto in the light of the above teachings. It is therefore to be understood that within the scope of the appended claims, the invention may be practiced otherwise than as specifically described.

I claim:

1. A method for preparing metal-ceramic composite body by impregnating a porous ceramic preform with a molten metal, comprising the steps of:

setting a porous ceramic preform having continuous internal porosity, a crucible containing a molten metal and a channeling bundle of a plurality of filaments which are wettable by the molten metal and having one end and an opposite end such that the one end of the bundle is disposed above the molten metal in the crucible and the opposite end of the bundle is disposed in contact with the preform, moving the crucible upward until the one end of the bundle is immersed in the molten metal whereby the molten metal is channeled to the preform through the filaments of the bundle and impregnates the preform through gravity; and moving the crucible downward until the one end of the bundle is removed from the molten metal whereby channeling of the molten metal to the preform is interrupted.

2. The method of claim 1 wherein at least two preforms are used.

3. The method of claim 1 wherein the preform has a length of at least 2 meters.

4. The method of claim 1 wherein the preforms are prepared from a ceramic powder composed of at least one member selected from the group consisting of alumina, zirconia, tungsten carbide, silicon carbide, silicon nitride, and carbon.

5. The method of claim 4 wherein the powder has a mean particle size of less than about 1 mm.

6. The method claim 4 wherein the powder has a mean particle size in the range from about 1 to about 500 μm.

7. The method of claim 1 wherein the filaments have a diameter of up to 100 μm.

8. The method of claim 7 wherein the filaments have diameters of up to 50 μm.

9. The method of claim 7 wherein the filaments have diameters of up to 15 μm.

10. The method of claim 1 wherein the filaments are carbon fibers, silicon carbon fibers, alumina fibers or glass fibers.

11. The method of claim 1 wherein the filament bundle is the form of a string, strip or fabric.

12. The method of claim 11 wherein the filament bundle is the form of a string having a diameter of from about 0.1 to about 1 mm.

13. The method of claim 1 wherein the metal is selected from the group consisting of aluminum, silicon, magnesium, nickel, cobalt/titanium, tin, zinc, copper, and alloys thereof.

14. The method of claim 1 wherein the impregnation with the molten metal is carried out in an inert atmosphere or in a vacuum.

15. The method of claim 14 wherein the vacuum is less than 10 Torr.

* * * * *